United States Patent [19]

Vardi et al.

[11] 4,343,159
[45] Aug. 10, 1982

[54] ABSORBER UNITS OF CHILLERS

[75] Inventors: Isaih Vardi, Rehovot; Yigal Kimchi, Ramat Gan; Jonathan Ben-Dror, Hadar Am, all of Israel

[73] Assignee: Tadiran Israel Electronics Industries, Ltd., Tel Aviv, Israel

[21] Appl. No.: 150,136

[22] Filed: May 15, 1980

[30] Foreign Application Priority Data

May 16, 1979 [IL] Israel .......................... 57310

[51] Int. Cl.³ .............................................. F25B 43/04
[52] U.S. Cl. ........................................................ 62/475
[58] Field of Search .................................. 62/475, 494

[56] References Cited

U.S. PATENT DOCUMENTS

| | | | |
|---|---|---|---|
| 2,840,997 | 7/1958 | Leonard, Jr. | 62/475 X |
| 2,959,931 | 11/1960 | Leonard, Jr. | 62/494 X |
| 3,120,113 | 2/1964 | Stubblefield et al. | 62/475 |
| 3,131,552 | 5/1964 | McNeely | 62/475 |
| 3,241,335 | 3/1966 | Embury | 62/475 |
| 3,367,134 | 2/1968 | Bourne | 62/475 |
| 3,491,553 | 1/1970 | Briggs | 62/475 |
| 3,520,150 | 7/1970 | McNeely | 62/475 |
| 3,555,849 | 1/1971 | Bell, Jr. | 62/475 |
| 3,701,265 | 10/1972 | Leonard, Jr. | 62/475 |
| 3,949,566 | 4/1976 | Hopkins | 62/475 |

Primary Examiner—Lloyd L. King
Attorney, Agent, or Firm—Fleit & Jacobson

[57] ABSTRACT

The present invention relates to an absorption chiller using water as refrigerant and aqueous lithium bromide or the like as absorbant, provided with one or more horizontal tubes through the absorber serving as conduits for water, subdivided into a plurality of individual compartments by means of seals substantially perpendicular to said tube or tubes, a purge line and a drain line being provided leading from each of the compartments. According to one embodiment, a liquid seal is provided for each of the compartments preventing horizontal flow of water vapor and non-condensables.

9 Claims, 3 Drawing Figures

ABSORBER UNITS OF CHILLERS

FIELD OF THE INVENTION

The present invention relates to improvements in chillers of the type using water as refrigerant and aqueous lithium bromide and/or similar substances as absorbant. More particularly the invention relates to improvements in the absorbers of such chillers.

BACKGROUND OF THE INVENTION

It is imperative to remove non-condensable gases in as complete a manner as feasible from the absorbers of chillers based on the use of aqueous lithium bromide and the like as absorbent for water vapor. Such non-condensables are generally air and hydrogen and possibly other gases like ammonia etc. The removal of the non-condensables is generally accomplished by means of water vapor pushing said non-condensables out at the bottom of the bundle of horizontal absorber tubes. The efficiency of well purged chillers compared with that of unpurged ones is higher by up to about 70%, and if certain alcohols are used as additive, the improvement can reach 100%.

As the water vapor moves downwards passing through the bundle of horizontal tubes, it condenses and its velocity decreases to about half the initial velocity at about the middle of the tube bundle. At the lower end of the tube bundle lower velocities may result in random currents, and an adequate velocity is attained by resorting to a non-uniform arrangement of the tubings.

A problem arises due to the horizontal temperature gradient from one end of the tubes to the other. This gradient depends on the number of passes of the water through the absorber. Typically a temperature rise of about 5° C. of the water in the tubes take place, and in a one-pass arrangement this is the temperature gradient between the two ends of the tube. When a number of passes is employed this temperature gradient is to be divided by the number of passes.

The colder part of the tube has a greater capability of condensing water vapor than the hotter part, and thus there exists a tendency of water vapor to pass through the warmer part of the tubings and to move towards the colder part. Non-condensables are swept along with the water-vapor and thus their removal is impaired. If this process continues, non-condensables tend to accumulate and lead to a serious impairment of the efficiency of the chiller. It is an object of the present invention to overcome the drawbacks resulting from the horizontal temperature gradient of the horizontal tubes passing through the absorber.

SUMMARY OF THE INVENTION

According to the present invention there is provided an improved absorber of a chiller using water as refrigerant and lithium bromide or the like as absorbant, said absorber being divided into a plurality of compartments, drain and purge lines being provided from each of the compartments. This arrangement results in a substantial improvement in the removal of non-condensable gases (air, hydrogen etc.) and thus in a substantial improvement in the efficiency of the chiller.

According to a preferred embodiment the tube support sheets arranged perpendicular to the horizontal tubes form the partitions between the individual compartments. According to a preferred embodiment of the invention the purge lines converge into a vessel maintained at a pressure lower than that of the various compartments. Preferably such low pressure is attained by spraying a suitable cooled solution of lithium bromide into said vessel, baffle means being provided in said vessel separating the inlet tubes from each other. A comparatively small quantity of subcooled lithium bromide solution is adequate for maintaining this pressure lower than that in the compartments of the absorber. The lithium bromide sprayed in the said chamber is returned to the absorber, while the noncondensable gases are removed from the upper part of the said chamber, and conveyed to a purge pump.

The temperature gradient beween the water inlet into the horizontal tubes through the absorber and outlet is about 5° C., and the gradient along each tube depends on the number of horizontal tubes over which such 5° C. temperature difference is divided. If a five-pass arrangement is used, the temperature difference along each of the tubes will be only 1° C. In order to overcome the deleterious effects of the horizontal temperature gradient, the absorber is divided into a plurality of compartments by means of partitions perpendicular to the horizontal tubes. The preferred length of each such compartment is about 75 to 150 cm, depending on the overall length of the absorber which is generally 3 to 5 meters long. Preferably the tube support sheets are used as partitions and these can be extended downwards to the bottom of the absorber, or at least to below the liquid level in the compartments, forming a seal between the compartments. The pressure at the lower part of the various compartments will be different due to the temperature difference of the water flowing through the tubings.

In a typical 100 ton chiller a quantity of about 20 lb water vapor enters the upper part of the absorber, at a velocity of about 100 ft/sec and this decreases to about 50 ft/sec at the middle of the tube bundle.

A purge line leads from each of the compartments to a common low-pressure chamber, into which a subcooled lithium bromide solution is sprayed. Subcooling by about 1° to 2° C. is adequate and the quantity of lithium bromide will generally vary between about 3 to 8 gallons/minute. The upper part of the low-pressure chamber is connected to an aspirator or to a suitable vacuum pump. A jet aspirator of about 1 cu-ft/min is generally adequate and this conveys the vapor with entrained non-condensables to a separate vessel, said noncondensables being removed at the upper end of the separator while the lithium bromide is recycled from its bottom to the nozzles in the low-pressure chamber.

In said low-pressure chamber there is advantageously provided a baffle subdividing the lower part of the vessel into a number of compartments, according to the number of compartments of the absorber, the purge lines leading into said lower part of the low-pressure vessel. Due to the sub-cooling of the lithium bromide sprayed into this chamber, the chamber is maintained at a pressure lower than that of any of the compartments of the absorber. Each of the compartments is provided with a drain pipe for draining off lithium bromide solution which is passed via a heat exchanger to the generator of the chiller. The purge lines of the non-condensables are located at the lower part of the absorber, preferably below the lowest tubes in the compartments. The arrangement of the multicompartmented absorber results in a very efficient removal of non-condensable gases (air, hydrogen etc.) and in a pronounced improvement in the efficiency of the chiller.

The invention is described by way of example with reference to the enclosed schematical drawings, which are not according to scale and in which.

Figure 1:
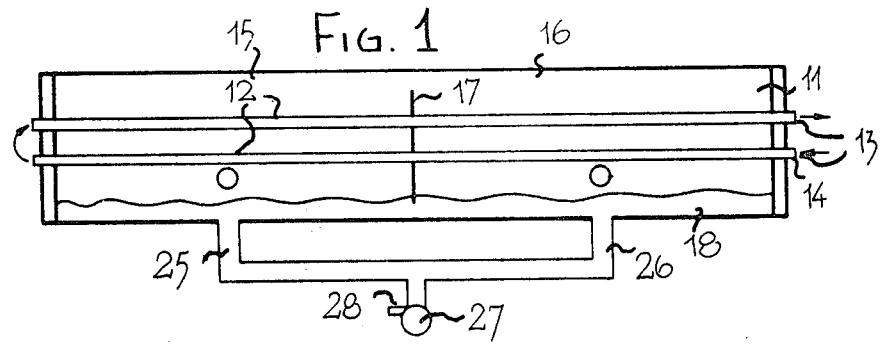
FIG. 1 is an elevational sectional view through an absorber according to the invention.
Figure 2:
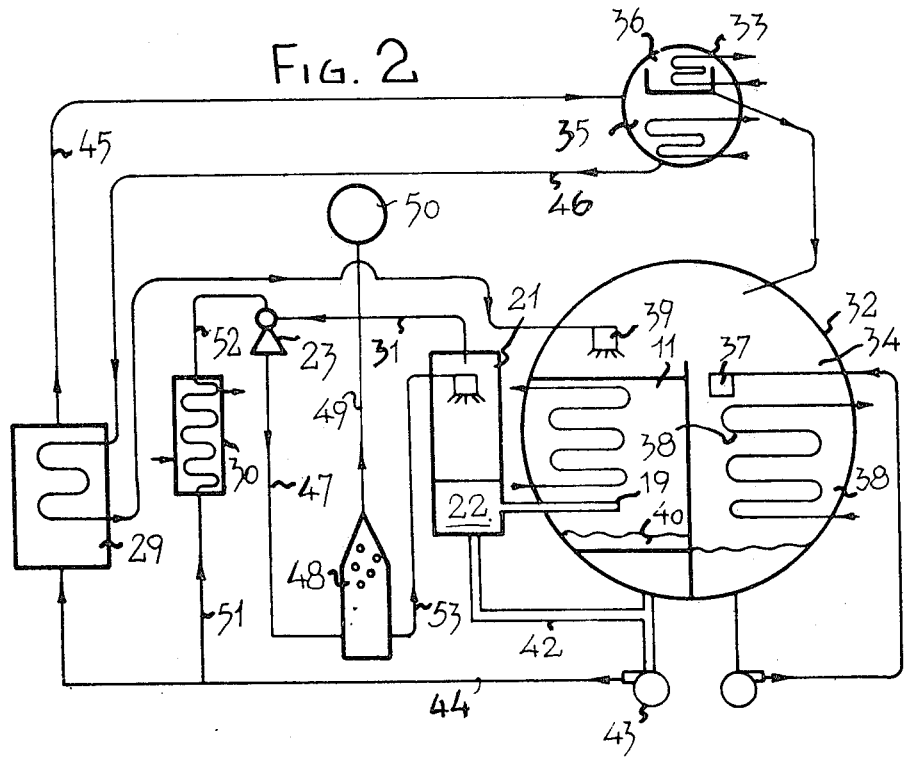
FIG. 2 is a schematical side view of a chiller comprising an absorber according to the invention.
Figure 3:
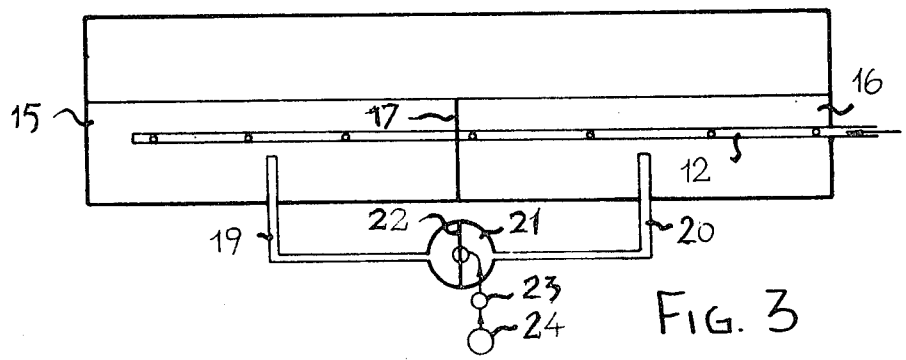
FIG. 3 is a top view of the absorber of FIG. 1.

As shown in FIGS. 1, 2 and 3, the absorber 11 is provided with a two-pass horizontal tube 12 wherein water is circulated, the temperature gradient between the two ends 13 and 14 being about 5° C., i.e. about 2.5° C. per tube. The absorber is subdivided into two compartments 15 and 16, divided by partition 17 which is also a tube-support and which extends to below the surface of the lithium bromide solution 18. From each of the compartments 15 and 16 there extend purge lines 19 and 20, respectively leading to the low-pressure chamber 21, subdivided by internal baffle 22, which chamber is connected with the separator jet 23 and spray nozzle 24.

From each of the compartments 15 and 16 there extends a drain-line 25 and 26, respectively for the lithium bromide solution, leading to pump 27 and to conduit 28 which leads to the heat-exchangers 29 and 30.

Due to the subdivision into two compartments, the temperature gradient along the part of the tube in each of the compartments is only 1.25° C. When a larger number of compartments are provided, by using more than one internal partition, the temperature gradient in each compartment is correspondingly decreased, thus diminishing the deleterious effect of the horizontal temperature gradient.

The tube-support sheets constituting the seals of the compartments can be used in such manner as to form a seal at the bottom of the absorber. The pressure in the various compartments differs according to the temperature at the bottom of each of the compartments. The drains of the lithium bromide solutions are arranged in such manner as to provide a liquid seal in each of the compartments. The non-condensables are purged to the low-pressure chamber 21, from which the lithium bromide is recycled, while the non-condensables are removed from the top of the low-pressure chamber via conduit 31.

As shown in FIG. 2 a chiller of the type using water as refrigerant and lithium bromide as absorbant for water vapor comprises essentially in combination two vessels 32 and 33 maintained at low pressures, where vessel 32 houses the absorber 11 and the evaporator 34, whereas 33 houses the generator 35 and the condenser 36.

Refrigerant (water) enters the top of the evaporator 34 and is sprayed by nozzles 37 over the evaporator tube bundle 38. Heat from the liquid which is being chilled, and which circulates through tubes 38 evaporates the refrigerant. The water vapor moves to the absorber 11 where a spray of lithium bromide via nozzles 39 absorbs the vapor and the dilute lithium bromide solution 40 collects at the bottom of the absorber. The absorber 11 is subdivided into 2 compartments 15 and 16, as shown in FIGS. 1 and 3, or into a larger number of such compartments. Some water vapor and non-condensables are removed from the absorber via purge line 19 to the low-pressure chamber 21, which is provided with baffle 22 and into which subcooled lithium bromide is sprayed via nozzles 41 while lithium bromide solution is drained via conduit 42 to pump 43 and via conduit 44 to heat exchanger 29 and from there to generator 35 via conduit 45. The lithium bromide, after concentration, returns via conduit 46 via heat exchanger 29 to absorber 11, while a small part of the lithium bromide passes via heat exchanger 30, aspirator 23, conduit 47, separator 48 to nozzle 41. Non-condensables leave the low-pressure chamber 21 at the top via conduit 31 and aspirator 23 which is actuated by a flow of lithium bromide, separate in separator 48 and leave at its top via conduit 49 to storage vessel 50. Part of the lithium bromide solution coming via conduit 44 from pump 43 is circulated via conduit 51 through heat exchanger 30, where it is subcooled and conveyed via conduit 52 through aspirator 23 and via conduit 47 to separator 48 with entrained non-condensables coming via conduit 31 from the low-pressure chamber 21. The lithium bromide solution is conveyed via conduit 53 to spray-nozzles 41 in the low-pressure chamber 21.

The separation of the absorber 11 into a plurality of compartments results in a corresponding decrease of the horizontal temperature gradient, and this prevents the undesirable horizontal movement of the non-condensables, improving the removal efficiency of these via low pressure chamber 21 and separator 48.

It is clear that the above description is by way of illustration only and that many variations and modifications in the nature and arrangement of parts can be resorted to without departing from the scope and spirit of the invention.

We claim:

1. In an absorption chiller comprising an absorber, an evaporator, a condenser, and a generator using water as refrigerant and aqueous lithium bromide as absorbant, the improvement which comprises: an absorber vessel having at least one horizontal conduit means extending through the absorber serving as conduits for water, the vessel being subdivided into a plurality of individual compartments by sealing means substantially perpendicular to said conduit means; and a purge line for removing non-condensable gases, and means for removing liquid provided in each of the compartments.

2. A chiller as claimed in claim 1, wherein the sealing means is adapted to prevent horizontal flow of water vapor and non-condensables.

3. A chiller as claimed in claim 1, wherein the purge lines lead to a chamber having means for maintaining a pressure lower than that of any of the compartments.

4. A chiller according to claim 3, where the chamber comprises means for spraying subcooled lithium bromide solution.

5. A chiller according to claim 1, wherein tube support means are the sealing means forming the compartments.

6. A chiller according to claim 1, wherein purge line is connected to a a vacuum pump.

7. A chiller according to claim 3, wherein the low-pressure chamber is provided with baffle means separating the inlets of the purge lines from each other.

8. A chiller according to claim 4, wherein the spraying means is adapted to spray about 3 to 8 gallons per minute.

9. The chiller of claim 1, further comprising a low pressure vessel having a lower end divided into a plurality of compartments by baffle means, the compartments being equal in number to the compartments of the absorber, each purge line of each absorber compartment being in vapor communication with a compartment of the low pressure vessel; means for spraying aqueous lithium bromide in an upper portion of the vessel; an outlet means for removing non-condensable gases above the spraying means; and a means for removing liquid from the lower end of the low pressure vessel.

* * * * *